United States Patent [19]

Michal

[11] 4,361,221
[45] Nov. 30, 1982

[54] FILM TRANSPORTING APPARATUS

[75] Inventor: Vratislav M. Michal, Rochester, N.Y.

[73] Assignee: Eastman Kodak Company, Rochester, N.Y.

[21] Appl. No.: 195,984

[22] Filed: Oct. 14, 1980

[51] Int. Cl.³ .............................................. B65G 47/26
[52] U.S. Cl. .................................... 198/459; 198/472; 198/492
[58] Field of Search .................... 221/77, 85; 198/460, 198/459, 472, 626, 633, 492; 193/35

[56] References Cited

U.S. PATENT DOCUMENTS

| | | | |
|---|---|---|---|
| 1,819,032 | 8/1931 | Lehman | 193/40 |
| 1,841,926 | 1/1932 | Zuehl | 221/298 X |
| 1,979,799 | 11/1934 | Heineman | 198/19 |
| 3,221,867 | 12/1965 | Bergling et al. | 198/183 |
| 3,327,835 | 6/1967 | Wunsche | 198/459 X |
| 3,650,376 | 3/1972 | Burgis | 198/129 |

FOREIGN PATENT DOCUMENTS

| | | | |
|---|---|---|---|
| 2314879 | 1/1977 | France | 198/473 |
| 1135792 | 12/1968 | United Kingdom | 198/459 |

Primary Examiner—John J. Love
Assistant Examiner—Paul A. Sobel
Attorney, Agent, or Firm—R. A. Fields

[57] ABSTRACT

A transport chain includes chain links having respective nests for receiving spindles, each supporting a bank of film discs. The chain is advanced to convey spindles received in the nests successively along a transport path to photofinishing equipment, for example. A stop member is disposed in the transport path proximate the photofinishing equipment to stop the forwardmost spindle as the chain continues to advance. The forward end of a rocker arm is raised by the forwardmost spindle stopped in the transport path, which lowers a rearward end of the rocker arm into the transport path to block the next following spindle from advance with the chain. In this way, separation is maintained between the two banks of film discs supported on the forwardmost and next following spindles. Transfer of the forwardmost spindle from the chain to the photofinishing equipment allows the forward end of the rocker arm to be lowered, which raises the rearward end of the rocker arm from the transport path to free the next following spindle for resumed advance with the chain.

1 Claim, 4 Drawing Figures

1

FILM TRANSPORTING APPARATUS

CROSS REFERENCE TO A RELATED APPLICATION

Reference is made to commonly assigned, copending patent application Ser. No. 84,037, filed Oct. 12, 1979, now U.S. Pat. No. 4,252,430, in the name of V. M. Michal and entitled FILM PROCESSING APPARATUS.

BACKGROUND OF THE INVENTION

1. Field of the Invention

The present invention generally relates to power-driven transporting apparatus for moving a plurality of articles in succession from one place to another. More particularly, the invention relates to apparatus for conveying banks of film discs supported on respective spindles and for spacing the conveyed spindles to prevent the banks of film discs from contacting each other.

2. Description of the Prior Art

A film disc intended for use in a modern compact-type camera is disclosed in commonly assigned U.S. Pat. No. 4,194,822 issued Mar. 25, 1980. The film disc has a central aperture and includes a plastic hub member, concentrically disposed about the aperture. The hub member is permanently attached to the film disc and has a keyway for securing the hub member to a keyed spindle received in the central aperture.

To process a number of the film discs, for example using the film processor disclosed in the patent application cross-referenced above, the film discs are supported in substantially parallel hub-to-hub relation on the keyed spindle and the spindle and the film discs are rotated in processing solution about a common, generally horizontal axis. A pair of circular end caps on the spindle hold the film discs snugly together in their hub-to-hub relation. One or both of the end caps are slidable along the spindle to secure selected number of the film discs on the spindle, and one of the end caps is removable from an end of the spindle to permit loading or removal of the film discs onto and from the spindle. When held on the spindle, the film discs are spaced slightly apart, generally by the thickness of the hub members. Such spacing provides a compact arrangement of film, yet provides sufficient solution access to the imaging areas of the film discs for processing.

The present invention is directed to apparatus for conveying banks of film discs supported on respective spindles to various photofinishing equipment, such as the film processor disclosed in the cross-referenced patent application. A review of the conveying art of which I am aware, e.g., U.S. Pat. Nos. 1,979,799 and 3,221,867, led me to conclude that such known conveyors are not suitable for conveying the banks of film discs. In these conveyors, a number of articles are conveyed in succession on moving endless chains or sets of rollers. If it is desired to stop the leading, i.e., forwardmost, article on the conveyor, a stop member is positioned in the path of the leading article to block its further movement. The conveyor continues to move, which causes the succeeding articles following the stopped article to accumulate one immediately behind the other against the stopped article, until the stop member is removed. When article accumulation occurs in this manner, appreciable article-damaging back pressures can build up (unless the conveyor is temporarily stopped). Moreover, such article accumulation, especially in the example of conveying the banks of film discs, can cause the conveyed articles to engage one another, possibly damaging sensitive surfaces of the articles, such as the engaging areas on the film discs, and usually necessitating disengagement of the articles before resuming conveyance.

SUMMARY OF THE INVENTION

The present invention is directed to apparatus for transporting banks of film discs supported on respective spindles and for spacing the spindles to prevent the banks of film discs from contacting each other. Such apparatus operates to prevent accumulation of the banks of film discs upon stopping the forwardmost spindle. This is done by continuously maintaining separation of the transported spindles during their stop-and-go movement. According to the present invention, there is provided the following unique combination: two substantially parallel transport chains including respective series of chain links, each of the links having a nest for receiving an opposite end portion of a spindle to support the film discs on the spindle between the chains;

drive means for advancing the chains to convey a succession of spindles;

two stop means disposed adjacent respective chains for blocking the opposite end portions of a forwardmost spindle conveyed on the chains, though allowing the chains to continue advancing beneath the forwardmost spindle;

a pair of substantially parallel rocker arms each having a forward end normally resting on a respective chain at a location immediately preceding one of the stop means and a rearward end normally disposed above a respective chain at a location remote from one of the stop means, said rocker arms being pivotally mounted for raising of their forward ends by the opposite end portions of the forwardmost spindle to lower their rearward ends toward the respective chains for blocking the opposite end portions of the next-following spindle conveyed on the chains; and means for urging the forward ends of the rocker arms lightly against the chains.

DESCRIPTION OF THE PREFERRED EMBODIMENT

Figure 1:
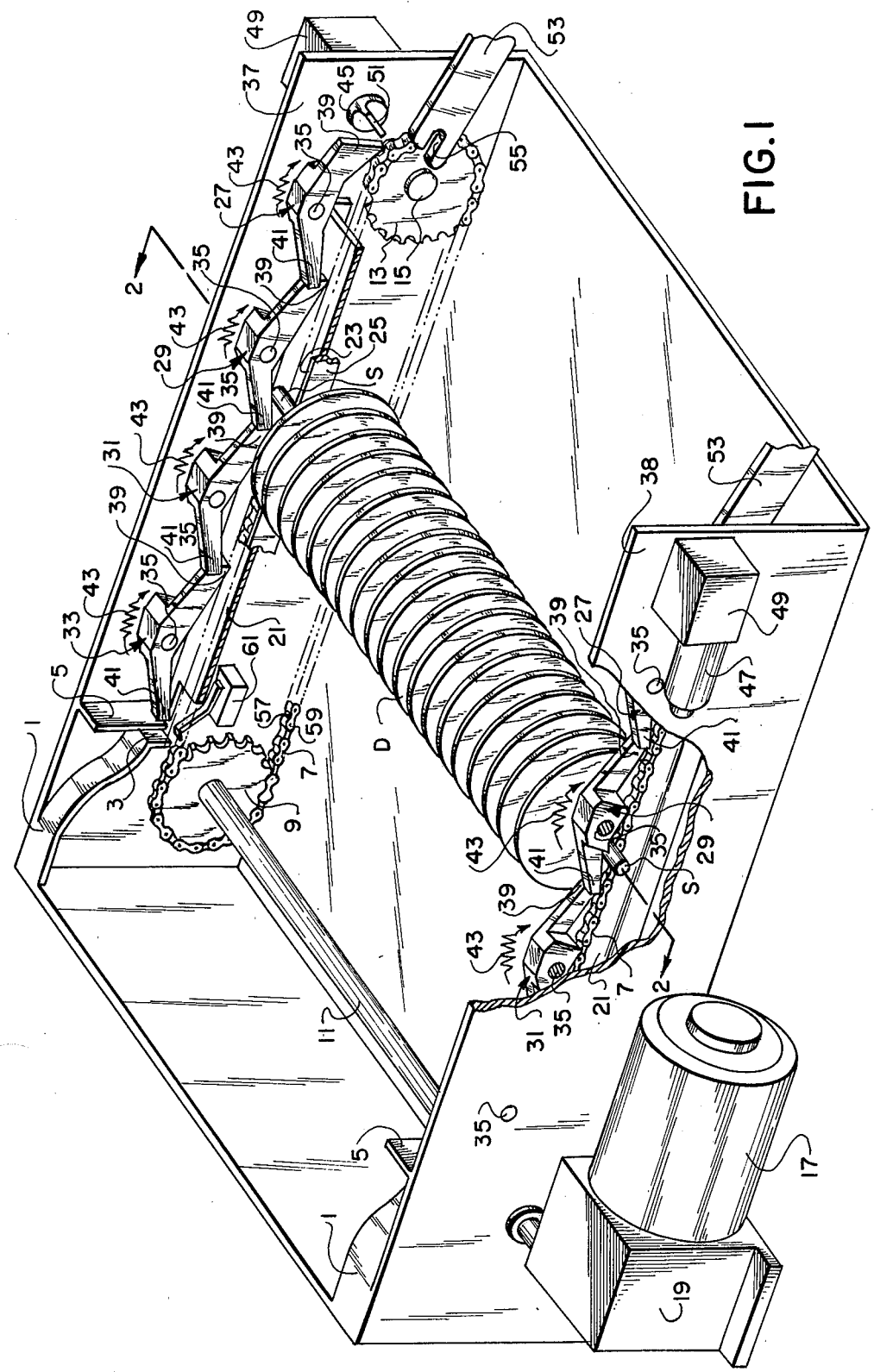
FIG. 1 is a perspective view of film transporting apparatus in accordance with a preferred embodiment of the present invention and shows a bank of film discs supported for conveyance on a pair of transport chains in such apparatus.

Referring now to the drawings, apparatus is depicted in accordance with the present invention for conveying several banks of film discs in succession to a destination such as a film processor. The film processor, though not illustrated in the drawings, is disclosed in the cross-referenced patent application. The film discs are disclosed in commonly assigned U.S. Pat. No. 4,194,822. Each film disc D, shown in FIG. 1, includes a flexible but relatively stiff support disc that is coated on one of its face surfaces with a photosensitive emulsion to define a dimensionally stable and self-supporting annular imaging area. The support disc is fixed to a rigid center hub H, shown in FIG. 2, which is somewhat thicker than the support disc and includes a central aperture and a keyway for receiving a keyed spindle S. To process a bank of the film discs D in the processor, the film discs are supported in substantially parallel hub-to-hub relation on the spindle S and the spindle and the bank of film discs are rotated in processing solution about a common, generally horizontal axis which extends perpendicularly to and axially of the film discs. A pair of circular end caps C on the spindle S hold the film discs D snugly together in their hub-to-hub relation during rotation. Both of the end caps C are slidable along the spindle to secure selected numbers of the film discs D on the spindle, and at least one of the end caps is removable from an end of the spindle to permit loading and removal of the film discs onto and from the spindle. When held on the spindle S, the film discs D are slightly spaced apart, generally by the thickness of the center hubs H. Such spacing provides a compact arrangement of film, yet provides sufficient solution access to the imaging areas of the film discs for processing.

Figure 2:
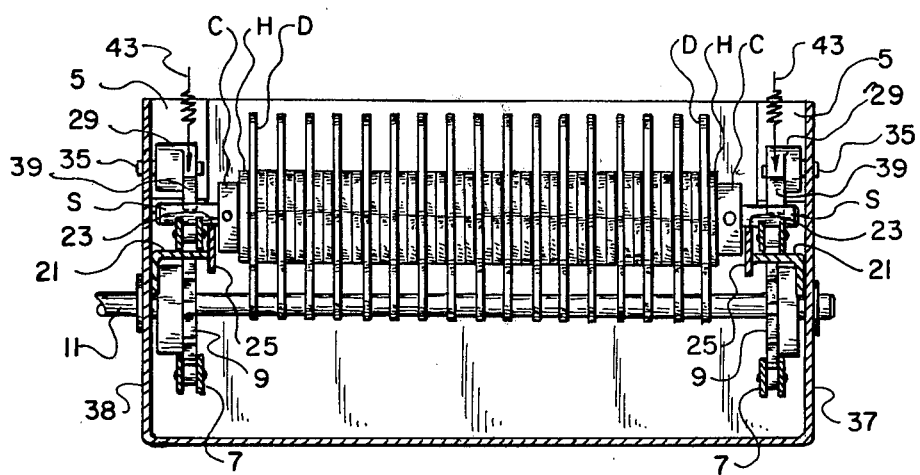
FIG. 2 is a vertical sectional view as seen in the direction of the arrows from the line 2—2 in FIG. 1.

As depicted in FIG. 1, according to the present invention the transporting apparatus for conveying a bank of film discs D supported on a spindle S includes two entry-loading ramps 1 down which opposite end portions of the spindle are intended to be rolled. The spindle end portions drop between spaced vertical guide plates 3 and 5, adjacent each loading ramp, and come to rest on a pair of endless transport chains 7, extending parallel to each other. The two chains 7, which preferably are constructed of plastic material, operate to convey the bank of film discs D supported on the spindle S through the transporting apparatus to the film processor disclosed in the cross-referenced patent application. A pair of sprocket drive wheels 9, connected by a shaft 11, and a pair of sprocket idler wheels 13, mounted on respective studs 15, support the two chains 7 for movement generally in a clockwise direction, in FIG. 1. A suitable drive motor 17 and a gear coupling 19 provide the power drive for the two sprocket drive wheels 9. During movement of the two chains 7, the upper reach of each chain rides on a support rail 21 and the opposite end portions of the spindle S ride on respective bearing surfaces 23 of parallel vertical plates 25, shown in FIG. 2. The two plates 25 cooperate with the end caps C on the spindle S to prevent axial movement of the spindle during conveyance by the chains 7.

Referring again to FIG. 1, two identical series of rocker arms 27, 29, 31 and 33 are generally disposed slightly above the respective chains 7. Individual pins 35, coupled to opposite side walls 37 and 38, support the rocker arms for pivotal movement of their forward and rearward ends 39 and 41 into and out of contact with the chains 7. Torsional springs 43 normally urge the forward ends 39 of the rocker arms into light contact with the chains, which causes the rearward ends 41 of the rocker arms to be positioned above the chains, as most clearly shown in FIG. 3. The rocker arms serve to maintain parallel separation between several banks of film discs conveyed in succession through the transporting apparatus. The manner in which this is accomplished is described below in connection with operation of the transporting apparatus.

In FIG. 1, two rotatably mounted gates 45, powered by respective solenoids 47 and gear couplings 49, include individual spindle stop members 51, located adjacent the forward ends 39 of the two rocker arms 27. The two stop members 51 serve to block the opposite end portions of the spindle S supporting the bank of film discs D, in FIG. 1, to prevent continued conveyance of the spindle and the film discs. Proximate each stop member 51, there is provided a pivotally mounted spindle transfer arm 53 for transferring the bank of film discs from the transporting apparatus to the film processor. The two transfer arms 53 have individual spindle receiving slots 55 which receive the end portions of the spindle S upon rotation of the two gates 45 in a counter-clockwise direction, in FIG. 1, to move the stop members 51 out of the way of such end portions.

OPERATION

Figure 3:
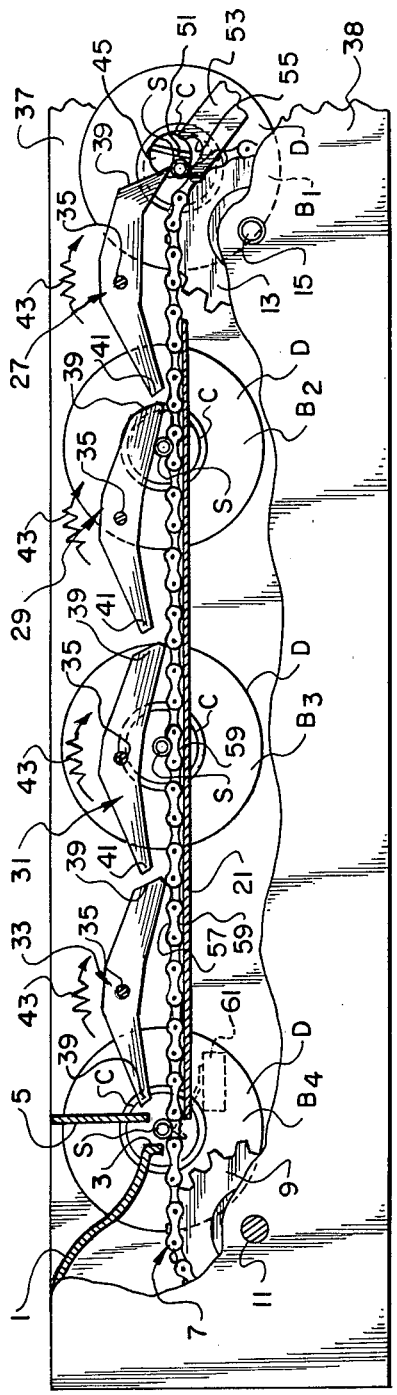
FIG. 3 is a side elevational view of the transporting apparatus depicted in FIG. 1 and shows several banks of film discs conveyed on the transport chains in such apparatus.
Figure 4:
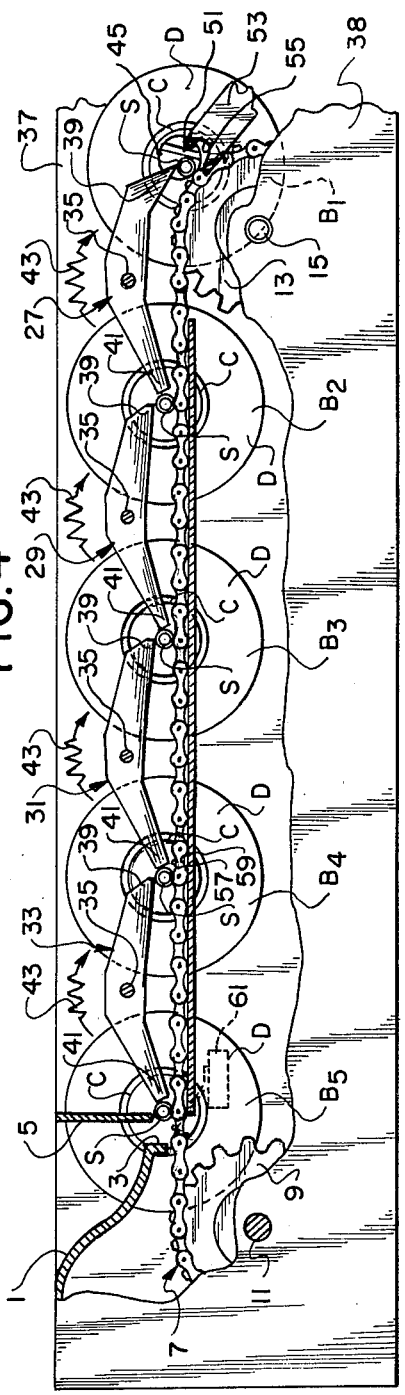
FIG. 4 is a side elevational view of the transporting apparatus depicted in FIG. 1 and shows operation of a series of rocker arms in the apparatus to maintain separation between several banks of film discs conveyed on the transport chains.

In FIG. 3, four parallel banks $B_1$, $B_2$, $B_3$, and $B_4$ of film discs D supported on respective spindles S are shown loaded into the transporting apparatus. The opposite end portions of the spindles are received in individual nests 57 of different chain links 59. A microswitch 61, located adjacent the space between a pair of the vertical guide plates 3 and 5, closes a conventional motor drive circuit (not shown) to initiate chain movement in a clockwise direction, in FIG. 3, upon being closed by an end portion of the spindle supporting the first-loaded bank $B_1$ of film discs D. Alternatively, chain movement may be initiated (by other means) before loading the first bank $B_1$ of film discs into the transporting apparatus. Movement of the two chains 7 in the clockwise direction conveys the several banks of film discs forward one after the other as the end portions of their supporting spindles are received on the two chains. The end portions of the forwardmost spindle supporting the first bank $B_1$ of film discs momentarily deflect the forward ends 39 of the rocker arms 33, 31 and 29 upward from the two chains and momentarily lower the rearward ends 41 of such rocker arms toward the two chains, against the contrary urging of the torsional springs 43, as the end portions of the forwardmost spindle are advanced beneath the forward ends of these rocker arms. When the end portions of the forwardmost spindle are advanced beneath the forward ends 39 of the two rocker arms 27 and deflect such forward ends upward from the chains 7, the stop members 51 of the two gates 45 block the spindle end portions from continued conveyance by the chains. The chains 7, however, continue to move in a clockwise direction, passing under the stopped end portions of the forwardmost spindle. The stopped end portions hold the forward ends 39 of the two rocker arms 27 raised from the respective chains 7. Consequently, the rearward ends 41 of the rocker arms 27 remain lowered adjacent the chains 7 and in the way of the end portions of the next-following spindle supporting the second bank $B_2$ of film discs. When the end portions of the next-following spindle are advanced against the lowered rearward ends 41 of the two rocker arms 27, they are blocked from continued conveyance and the chains 7 pass under such end portions. Accordingly, as shown in FIG. 4, the two rocker arms 27 operate to maintain parallel separation between the first and second banks $B_1$ and $B_2$ of film discs. In a similar manner, as shown in FIG. 4, the rocker arms 29, 31 and 33 operate to maintain parallel separation between the remaining banks $B_3$–$B_5$ of film discs.

To transfer the first bank $B_1$ of film discs D from the transporting apparatus to the film processor, the two gates 45 are rotated in a counterclockwise direction, in FIG. 4, moving the two stop members 51 out of the way of the opposite end portions of the forwardmost spindle. This allows the two chains 7 to move such spindle end portions from beneath the forward ends 39 of the two rocker arms 27 and into the receiving slots 55 in the two transfer arms 53. Then, the transfer arms are pivoted in a clockwise direction, in FIG. 4, to transfer the spindle to the film processor. Cam means (not shown) are provided in the film processor for removing the spindle end portions from the receiving slots 55.

When the opposite end portions of the forwardmost spindle supporting the first bank $B_1$ of film discs D are moved from beneath the forward ends 39 of the two rocker arms 27, the torsional springs 43 pivot such rocker arms in a clockwise direction, in FIG. 4, raising the rearward ends 41 of the rocker arms from the two chains 7. This frees the opposite end portions of the next following spindle supporting the second bank $B_2$ of film discs for movement with the chains. The chains advance the spindle end portions beneath the forward ends 39 of the rocker arms 27, again deflecting the forward ends upwards from the chains and again lowering the rearward ends 41 toward the chains. The stop members 51 of the two gates 45, which have rotated back to their orientations illustrated in FIG. 4, block the spindle end portions from continued conveyance by the chain. Consequently, the rearward ends 41 of the rocker arms 27 remain lowered adjacent the chains and in the way of the end portions of the spindle supporting the third bank $B_3$ of film discs. When these spindle end portions are advanced against the lowered rearward ends 41 of the rocker arms 27, they are blocked from continued conveyance. Accordingly, the rocker arms 27 now operate to maintain parallel separation between the second and third banks $B_2$ and $B_3$ of film discs. And in a similar manner, the rocker arms 29 and 31 now operate to maintain parallel separation between the remaining banks $B_4$ and $B_5$ of film discs.

After the second bank $B_2$ of film discs D is transferred from the transporting apparatus to the film processor, the above-described operation is continued until, finally, the remaining banks $B_4$ and $B_5$ of film discs have been transferred to the film processor.

The invention has been described in detail with particular reference to a preferred embodiment thereof, but it will be understood that variations and modifications can be effected within the spirit and scope of the invention.

I claim:

1. Apparatus for transporting banks of film discs supported on respective spindles between opposite end portions of the spindles and for spacing the spindles to prevent the banks of film discs from contacting each other, said apparatus comprising:

two substantially parallel transport chains including respective series of chain links, each of said links having a nest for receiving one of the opposite end portions of a spindle to support the film discs on the spindle between said chains;

drive means for advancing said chains to convey a succession of spindles;

two stop means disposed adjacent respective chains for blocking the opposite end portions of a forwardmost spindle conveyed on said chains, though allowing said chains to continue advancing beneath the forwardmost spindle;

a pair of substantially parallel rocker arms each having a forward end normally resting on a respective chain at a location immediately preceding one of said stop means and a rearward end normally disposed above a respective chain at a location remote from one of said stop means, said rocker arms being pivotally mounted for raising of their forward ends by the opposite end portions of the forwardmost spindle to lower their rearward ends toward said respective chains for blocking the opposite end portions of the next-following spindle conveyed on said chains; and means for urging said forward ends of said rocker arms lightly against said chains.

* * * * *